United States Patent [19]
Sato et al.

[11] 4,320,011
[45] Mar. 16, 1982

[54] OIL-CONTAINING WASTE WATER TREATING MATERIAL CONSISTING OF MODIFIED ACTIVE CARBON

[75] Inventors: Hiroshi Sato, Nagoya; Sadaaki Shigeta, Narashino; Yasuo Takenaka, Otake, all of Japan

[73] Assignee: Mitsubishi Rayon Company, Limited, Tokyo, Japan

[21] Appl. No.: 176,052

[22] Filed: Aug. 7, 1980

[30] Foreign Application Priority Data

Aug. 13, 1979 [JP] Japan .................. 54-102936

[51] Int. Cl.³ .............................................. C02F 1/28
[52] U.S. Cl. ..................................... 210/694; 210/502; 252/428
[58] Field of Search ............... 210/679, 680, 694, 924, 210/502, 506; 252/428, 438, 444

[56] References Cited

U.S. PATENT DOCUMENTS

| | | | |
|---|---|---|---|
| 3,479,299 | 11/1969 | Rivin et al. | 252/426 |
| 3,491,031 | 1/1970 | Stoneburner | 252/411 |
| 3,755,161 | 8/1973 | Yokota et al. | 210/679 |
| 3,813,347 | 5/1974 | Hayes | 252/428 |
| 3,901,818 | 8/1975 | Durand et al. | 210/680 |
| 3,996,161 | 12/1976 | Chia | 252/428 |
| 4,076,892 | 2/1978 | Fennimore et al. | 428/407 |

FOREIGN PATENT DOCUMENTS

| | | |
|---|---|---|
| 1180048 | 2/1970 | United Kingdom . |
| 1336281 | 11/1973 | United Kingdom . |
| 1420288 | 1/1976 | United Kingdom . |
| 1535597 | 12/1978 | United Kingdom . |

Primary Examiner—Ivars C. Cintins
Attorney, Agent, or Firm—Oblon, Fisher, Spivak, McClelland & Maier

[57] ABSTRACT

An oil-containing waste water treating material, comprising an active carbon upon whose surface is chemically bonded at least one nitrogenous compound which is an amine or a quaternarized derivative thereof.

7 Claims, No Drawings

OIL-CONTAINING WASTE WATER TREATING MATERIAL CONSISTING OF MODIFIED ACTIVE CARBON

BACKGROUND OF THE INVENTION

1. Field of the Invention

The present invention relates to an oil-containing waste water treating material which is effective in treating cleaning oil fractions, sewage or factory waste water containing various oil fraction mixtures and solids.

2. Description of the Prior Art

Many oil-water separating methods are known for the treatment of oil-containing waste water. For example, in one conventional technique applied to crude waste water which contains oil fractions comparatively easy to separate by a physical process, the waste water is filtered with sand to reduce the load on an active carbon adsorbent, is then passed through active carbon to adsorb oil thereon and is drained. If further processing is desirable, the waste water, after filtration over the sand bed and before contact with active carbon, is charged into a tower containing synthetic fibers having an affinity for oil, and the water discharged from the tower is then sent to the active carbon filtration zone. However, because of recent, more stringent regulations concerning the draining of waste water, the conventional active carbon treatment processes are insufficient in removing oil fractions from waste water to the required degree, and therefore, higher levels of treatment of waste water are required. This need is heightened by the fact that clean water itself is a valuable resource and therefore with efficient purification, waste water can serve as a source for pure water. On the other hand, in the instances of waste waters containing oil fractions which are difficult to remove such as those containing emulsified oil, a method is needed by which oil can be removed with a high degree of effectiveness. Therefore, a need continues to exist for an improved technique of removing contaminating oil fractions from various types of waste waters.

SUMMARY OF THE INVENTION

Accordingly, one object of the present invention is to provide an adsorbent material for the treatment of oil-containing waste water which removes the oil fraction with substantial efficiency.

Briefly, this object and other objects of the present invention as hereinafter will become more readily apparent can be attained by an oil-containing waste water treating material comprising an active carbon upon whose surface is chemically bonded at least one nitrogenous compound which is an amine or a quaternarized derivative thereof.

DESCRIPTION OF THE PREFERRED EMBODIMENTS

In the preparation of the modified active carbon adsorbent of the present invention, the active carbon which is used is preferably a granular or finely powdered material having a large surface area.

With regard to the nitrogenous compounds which are to be chemically bonded onto the surface of the active carbon, suitable compounds include primary amine compounds such as isopropylamine, isopropanolamine, N-aminoethylethanolamine, N-aminopropylmorpholine, 2-ethylhexylamine and the like; secondary amine compounds such as diethylamine, di-n-butylamine and the like; tertiary amine compounds such as trimethylamine, dimethylethanolamine, triethanolamine and methyldiethanolamine and the like; polyethylenepolyamines such as ethylenediamine, diethylenetriamine, triethylenetetramine and tetraethylenepentamine; nitrogenous vinyl compounds having amine structures such as dimethylaminoethyl methacrylate, diethylaminoethyl methacrylate and dimethylacrylamide; nitrogenous vinyl compounds having quaternary ammonium structures such as 2-hydroxy-3-methacryloxypropyltrimethylammonium chloride, methacrylic acid dimethylaminoethylmethyl chloride and the like; and nitrogenous vinyl compounds having pyridine structures such as 2-vinylpyridine and 4-vinylpyridine. Preferred nitrogenous compounds for the modification of active carbon are selected from this group of compounds.

The modified active carbon of the present invention can be prepared by a variety of methods. In one method a halogen such as fluorine, chlorine, bromine or iodine is bonded to the surface of active carbon having a phenanthrene structure, and then the halogenated active carbon is heated in an aqueous solution of a primary or secondary amine compound or a polyethylenepolyamine, whereby the halogen atoms are replaced by the amine compound to prepare the modified active carbon.

In another technique the halogenated active carbon immediate prepared as described above can be heated in an aqueous solution of a tertiary amine compound which results in modification of the active carbon surface to a quaternary ammonium salt.

The quaternary ammonium salt modification can also be prepared by heating the tertiary amine compound modified active carbon obtained in the first method discussed above in a proper solvent such as nitromethane together with a halide compound such as hydrochloric acid, methyl iodide, methyl chloride or butyl bromide.

In yet another method of preparation, a nitrogenous vinyl compound having an amine structure, which includes a pyridine structure, or a tertiary ammonium structure, is graft-polymerized onto the surface of active carbon to modify it. Thereafter, if desired, the modified carbon can be treated by a halide compound to quaternarize the amine structure. For example, in order to graft-polymerize a nitrogenous vinyl compound having a tertiary amine structure or quaternary ammonium structure, the nitrogenous vinyl compound is dissolved in a proper solvent such as an alcohol of which methanol is exemplary, and the polymerization reaction is promoted with an initiator such as azobisisobutyronitrile to graft-polymerize the nitrogenous vinyl compound onto the surface of active carbon. Thereafter, if desired, the active carbon modified with the nitrogenous vinyl compound having an amine structure can be treated with a halide compound in a proper solvent such as methanol in order to convert the amine structure to the quaternary salt. Further, if desired, a nitrogenous vinyl compound having an amine structure can be added to the modified carbon and thereafter again treated with a halide compound to quaternarize the added nitrogenous vinyl compound.

The treating material of the present invention which consists of active carbon modified by a nitrogenous compound as described above is far superior to conventional active carbon materials whose surfaces have not been modified in the removal of oil fractions from waste water. Further, in the cases where the nitrogenous compound introduced onto the surface of the active carbon is a polar or ion-exchanging compound, the modified active carbon will exhibit such a high degree of water affinity that it is very easily handled in waste water when charged into a column and when used as a slurry.

The modified active carbon treating material of the present invention can be used to clean waste water containing single or mixed oil fractions consisting of various mineral oils and animal and vegetable oils and can remove the oil fractions even if they are dispersed or emulsified in the waste water. Further, even if solids or pollutants other than oil fractions are contained in the waste water, the treating capacity will not be adversely affected. Moreover, because the nitrogenous compound used for the modification of the active carbon is chemically bonded to the active carbon, there is no possibility at all of secondary pollution by outflow into the water to be treated.

The active carbon treating material of the present invention can be used not only as an adsorbing material, but also as a grain coarsening material. When it is to be used as an adsorbing material, a slurry adsorbing system can be adopted. Usually, however, it is preferable to use a charged tower adsorbing system. When the modified active carbon is to be used as a grain coarsening material, the charged tower system can also be used, but a cartridge is convenient to handle.

The active carbon treating material of the present invention when used as an adsorbing material or grain coarsening material by the charged tower system can be reactivated for use by reverse flow washing or surface washing. When washing the material, water or air can be used.

The active carbon treating material of the present invention is very effective in treating waste water of widely varying types including such emulsified oil waste waters as cutting oil waste water, rolling oil waste water, oil tank washing waste water, machine washing waste water, paint factory waste water, food factory waste water and compressor drainage and such dispersed oils as oil tanker ballast water and bilge water which have been considered to be very difficult to treat.

Having generally described this invention, a further understanding can be obtained by reference to certain specific examples which are provided herein for purposes of illustration only and are not intended to be limiting unless otherwise specified.

EXAMPLE 1

In a four-necked flask, 900 g of carbon tetrachloride was added to 400 g of unmodified granular active carbon while being stirred. The mixture was refluxed at 100° C. and thereafter 30 g of bromine was gradually added thereto through a dropping funnel. The mixture was reacted for 8 hours. After the reaction, the active carbon was well washed with carbon tetrachloride to remove unreacted bromine and was then air-dried until there was no bromine. Upon elemental analysis, components other than C (carbon), H (hydrogen) and N (nitrogen) had greatly increased and were present in amounts of about 40% as compared with unmodified active carbon. It was clear that bromine had been introduced into the active carbon substrate.

|  | H in % by weight | C in % by weight | N in % by weight |
| --- | --- | --- | --- |
| Bromine Active Carbon | Not more than 0.3 | 60.4 | Not more than O.3 |
| Unmodified Active Carbon | Not more than 0.3 | 91.1 | Not more than 0.3 |

In a four-necked flask, 80 ml of an aqueous solution of 25% diethylenetriamine was added to 400 g of the bromine active carbon while being stirred, and the mixture was reacted under reflux at 100° C. for 8 hours. After the reaction, the active carbon was well washed with distilled water to completely remove unreacted amine and was then air-dried. When an elemental analysis was conducted, 1.1% N was present as compared to the unmodified active carbon. It was clear that diethylenetriamine had been introduced by the chemical reaction. It is believed that the chemical reaction involved is as follows:

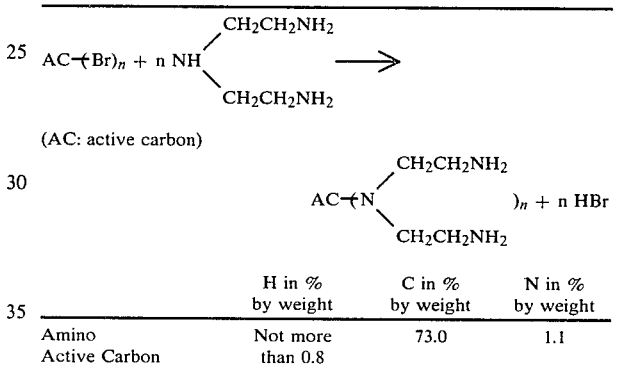

(AC: active carbon)

|  | H in % by weight | C in % by weight | N in % by weight |
| --- | --- | --- | --- |
| Amino Active Carbon | Not more than 0.8 | 73.0 | 1.1 |

A column of an inside diameter of 20 mm was charged with the diethylenetriamine modified granular active carbon to a height of 40 cm at a charging density of 0.79 g/cm³. A model emulsified oil containing 100 ppm of turbine oil and 5 ppm of a non-ionic surface active agent and stirred for 10 minutes with a domestic mixer as a crude water to be treated was passed through this charged layer at a rate of 1 m/hr. The oil fraction concentrations of the crude water and treated water were measured by measuring the turbidity of water samples. The crude water was found to have a turbidity of 80 to 120 ppm, while the treated water had a turbidity of 20 to 30 ppm. Even when the water passed over the adsorbent for 50 hours, these values did not substantially fluctuate.

CONTROL 1

When a column was charged with unmodified granular active carbon in the same manner as described in Example 1 and a model emulsified oil was passed through the column to test the oil fraction removal ability of the carbon, it was found that treated water had a turbidity of over 30 ppm after 10 hours of processing time but that with increasing time the turbidity of the treated water increased. The crude water entering the column had a turbidity of 80 to 120 ppm. It is apparent from these results that the performance of the unmodified active carbon was inferior to the modified active carbon material of the present invention.

EXAMPLE 2

In a four-necked flask, 2-vinylpyridine/methanol (50 g/200 ml) was added to 50 g of unmodified granular active carbon while being stirred, and the mixture was reacted under reflux at 64° C. for 3 hours by using azobisisobutyronitrile as a polymerization initiator under a flow of nitrogen gas. After the reaction, the active carbon was well washed with methanol to completely remove 2-vinylpyridine and was then air-dried. Upon elemental analysis, it was found that 1.8% N was present in comparison to the unmodified active carbon which has a N content of essentially zero. It was clear that 2-vinylpyridine had been introduced into the carbon by graft polymerization. The chemical reaction involved is believed to be as follows:

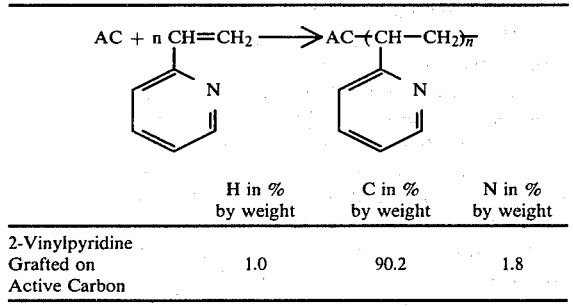

|  | H in % by weight | C in % by weight | N in % by weight |
|---|---|---|---|
| 2-Vinylpyridine Grafted on Active Carbon | 1.0 | 90.2 | 1.8 |

EXAMPLE 3

In a four-necked flask, a solution of n-butyl bromide/nitromethane (5 g/300 ml) was added to 9 g of the 2-vinylpyridine grafted active carbon contained in Example 2 while being stirred, and the mixture was reacted under reflux at 97° C. for 8 hours. After the reaction, the active carbon was well washed with nitromethane to completely remove the unreacted n-butyl bromide and was then air-dried. Upon elemental analysis, components other than C, H and N had increased by an amount of 13% in comparison to unmodified active carbon, and the quantity of nitrogen was 2.6%. Therefore, it was clear that n-butyl bromide had been introduced into the active carbon and that the nitrogen of the 2-vinylpyridine had been quaternarized. The chemical reaction involved is believed to be as follows:

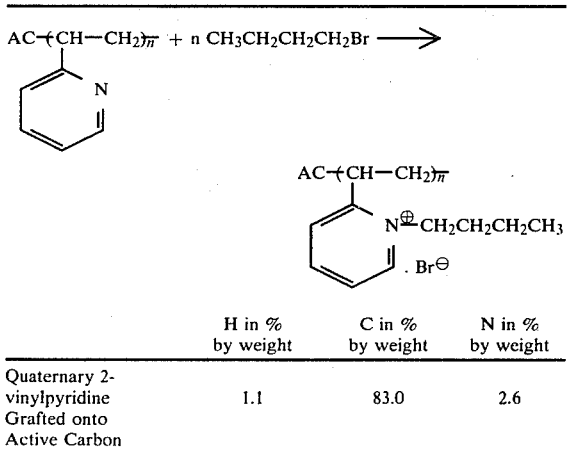

|  | H in % by weight | C in % by weight | N in % by weight |
|---|---|---|---|
| Quaternary 2-vinylpyridine Grafted onto Active Carbon | 1.1 | 83.0 | 2.6 |

EXAMPLE 4

In a four-necked flask, a solution of 2-hydroxy-3-methacryloxypropyltrimethylammonium chloride (A)/ethanol (50 g/200 ml) was added to 50 g of unmodified active carbon while being stirred, and the mixture was reacted under reflux at 78° C. for 3 hours using azobisisobutyronitrile as an initiator under a flow of nitrogen gas. After the reaction, the active carbon was well washed with ethanol to completely remove unreacted (A) material and was then air-dried. Upon elemental analysis, it was found that the modified carbon material contained 0.7% N in comparison to essentially zero percent nitrogen for unmodified active carbon. It was clear that (A) had been introduced into the carbon by graft polymerization. The chemical reaction involved is believed to be as follows:

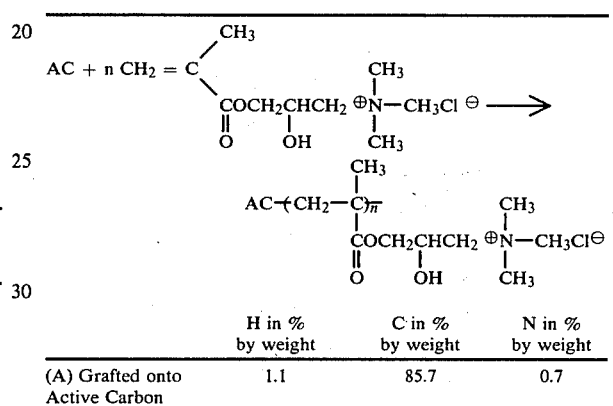

|  | H in % by weight | C in % by weight | N in % by weight |
|---|---|---|---|
| (A) Grafted onto Active Carbon | 1.1 | 85.7 | 0.7 |

EXAMPLE 5

4-Vinylpyridine was used instead of the 2-vinylpyridine in Example 2 and was chemically bonded to granular active carbon by graft polymerization. Thereafter, the nitrogen content was quaternarized by hydrochloric acid to obtain a modified active carbon. The chemical reaction involved is believed to be as follows:

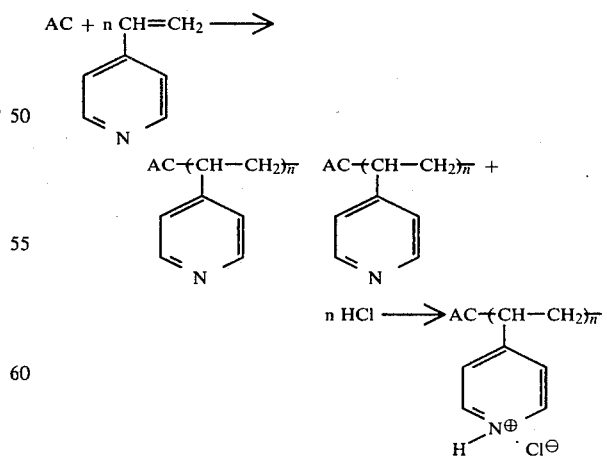

When a column was charged with the above-modified active carbon in the same manner as described in Example 1 and a model emulsified oil was passed through it to test the oil fraction removal ability of the modified carbon, it was found that the turbidity of the treated water was 20 ppm even after 200 hours of treatment. The crude water starting material had a turbidity of 80 to 120 ppm.

EXAMPLE 6

The quaternarized 4-vinylpyridine grafted active carbon obtained in Example 5 was further reacted with 4-vinylpyridine. The product obtained was then quaternarized once again with hydrochloric acid to obtain a modified active carbon material. The chemical reaction involved is believed to be as follows:

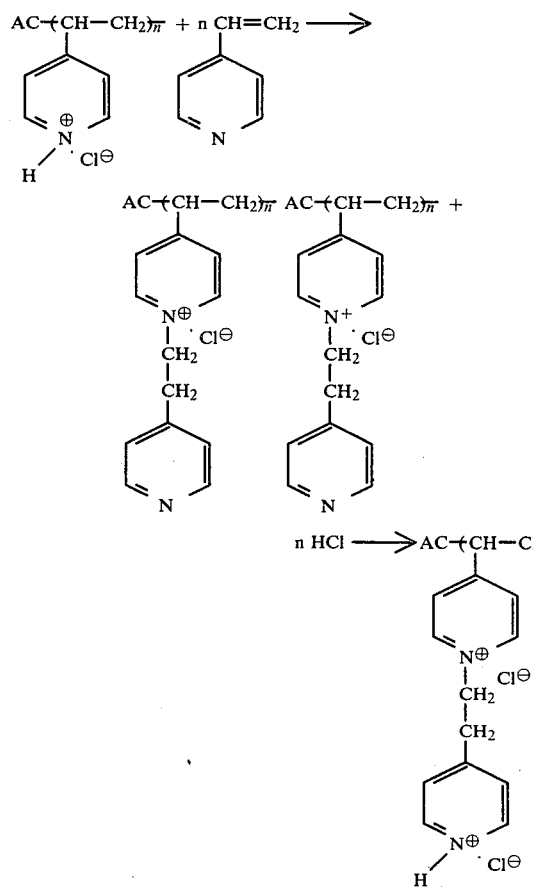

When a column was charged with the above-modified active carbon in the same manner as described in Example 5 and a model emulsified oil was passed through it to test the oil fraction removal ability of the modified carbon, it was found that the treated water discharged had a turbidity of 15 ppm and this value was maintained even after the passage of water for 250 hours. The crude water starting material had a turbidity of 80 to 120 ppm.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. An oil-containing waste water treating material, comprising:
   an active carbon upon whose surface is chemically bonded at least one nitrogenous vinyl compound having at least one structure selected from the group consisting of amine structures, and quaternary ammonium structures.

2. The treating material of claim 1, wherein said nitrogenous vinyl compound is dimethylaminoethyl methacrylate, diethylaminoethyl methacrylate, 2-hydroxy-3-methacryloxypropyltrimethylammonium chloride, methacrylic acid dimethylaminoethylmethyl chloride, 2-vinylpyridine or 4-vinylpyridine.

3. The treating material of claim 1, which is a modified active carbon wherein at least one said nitrogenous vinyl compound is graft polymerized on the surface of said active carbon.

4. The treating material of claim 1, which is a modified active carbon obtained by graft polymerizing a nitrogenous vinyl compound having an amine structure onto the surface of said active carbon and then treating said active rmcarbon with a halide.

5. The treating material of claim 1, which is a modified active carbon obtained by graft polymerizing a nitrogenous vinyl compound having an amine structure onto the surface of said active carbon, treating said active carbon subjected to graft polymerization with a halide, reacting a nitrogenous vinyl compound having an amine structure with the halide treated active carbon and then treating the product obtained with a halide.

6. The treating material of claim 4 or 5 wherein said halide is hydrochloric acid, methyl iodide, methyl chloride or n-butyl bromide.

7. A method of removal of oil fractions from oil-containing waste water, comprising:
   contacting said waste water with a bed of active carbon upon whose surface is chemically bonded at least one nitrogenous vinyl compound having at least one structure selected from the group consisting of amine structures, and quaternary ammonium structures.

* * * * *